United States Patent
Schaefer et al.

(10) Patent No.: US 7,240,608 B2
(45) Date of Patent: Jul. 10, 2007

(54) CYLINDER LINER FOR A CYLINDER CRANKCASE

(75) Inventors: Helmut Schaefer, Kernen (DE); Peter Stocker, Sulzbach (DE); Oliver Storz, Altbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/525,557

(22) PCT Filed: Aug. 13, 2003

(86) PCT No.: PCT/EP03/08971

§ 371 (c)(1),
(2), (4) Date: Sep. 26, 2005

(87) PCT Pub. No.: WO2004/025106

PCT Pub. Date: Mar. 25, 2004

(65) Prior Publication Data

US 2006/0112924 A1    Jun. 1, 2006

(30) Foreign Application Priority Data

Aug. 24, 2002 (DE) ................. 102 38 873

(51) Int. Cl.
*F02F 1/10* (2006.01)
*F16J 10/04* (2006.01)
*B22D 19/00* (2006.01)

(52) U.S. Cl. ............... 92/171.1; 29/888.061; 164/98

(58) Field of Classification Search ........ 92/171.1, 92/169.1; 123/193.2, 41.83; 138/155; 29/888.061, 29/888.06; 164/98
See application file for complete search history.

(56) References Cited

U.S. PATENT DOCUMENTS

| | | | | | |
|---|---|---|---|---|---|
| 982,739 | A | * | 1/1911 | Moore | 29/888.061 |
| 1,106,977 | A | * | 8/1914 | Schwarz | 92/163 |
| 1,562,555 | A | * | 11/1925 | Harley | 29/888.061 |
| 1,836,798 | A | * | 12/1931 | Hefti | 29/888.061 |
| 3,903,951 | A | * | 9/1975 | Kaneko et al. | 29/888.061 |
| 4,637,110 | A | * | 1/1987 | Yamagata | 29/888.061 |
| 5,080,056 | A | * | 1/1992 | Kramer et al. | 29/888.061 |
| 5,320,158 | A | * | 6/1994 | Helgesen | 29/888.061 |
| 6,769,474 | B2 | * | 8/2004 | Engels et al. | 164/312 |

FOREIGN PATENT DOCUMENTS

| | | |
|---|---|---|
| DE | 1 291 865 B | 4/1969 |
| DE | 42 30 584 A1 | 3/1994 |
| DE | 197 55 557 C1 | 2/1999 |
| DE | 692 30 319 T2 | 7/2000 |
| DE | 199 06 026 A1 | 8/2000 |
| DE | 199 37 934 A1 | 2/2001 |
| DE | 199 09 135 A1 | 8/2001 |
| DE | 201 21 215 U1 | 5/2002 |
| GB | 390 625 A | 4/1933 |

* cited by examiner

*Primary Examiner*—Thomas E. Lazo
(74) *Attorney, Agent, or Firm*—Akerman Senterfitt; Stephan A. Pendorf; Yonghong Chen

(57) ABSTRACT

A cylinder liner (2) for a cylinder block has a contouring (6) at one end. The contouring (6) serves to support the liner (2) on a sleeve (4) inside a die-casting tool. When the liner (2) is cast in, recesses (10) of the liner (2) are filled by the material of the cylinder crankcase whereby preventing the liner (2) from seating toward an oil chamber (14). The invention also relates to a method for producing a cylinder liner of the aforementioned type.

8 Claims, 4 Drawing Sheets

CYLINDER LINER FOR A CYLINDER CRANKCASE

CROSS REFERENCE TO RELATED APPLICATION

This application is a national stage of PCT/EP2003/008971 filed Aug. 13, 2003 and based upon DE 102 38 873 filed Aug. 24, 2002 under the International Convention.

FIELD OF THE INVENTON

The invention concerns a cylinder sleeve as well as a process for producing a cylinder sleeve.

RELATED ART OF THE INVENTION

Cylinder crank cases, in particular those for light metal motors, are frequently reinforced locally in the area of the cylinder running surfaces by a cylinder liner. Cast in cylinder liners generally extend through the so-called cylinder space from the crank case to the cylinder head separation plane.

Due to high pressures during the operation of the motor there may sometimes be caused a displacement of the cast in cylinder liner in the direction of the crank shaft housing. This is referred to as settling of the liner. The settling can be prevented in comparatively complex and labor intensive manner by casting technical methods or by surface treatment of the liner.

SUMMARY OF THE INVENTION

The task of the invention is comprised therein, of providing an economical device and method, in order to prevent the settling of the cylinder liner.

The task is solved by a cylinder sleeve for a cylinder crank case, thereby characterized, that the cylinder sleeve (2) includes on one end (5) a contouring (6), wherein at least one highest rise (8) of the contouring (6) supports the cylinder sleeve (2) in a pressure injection casting tool against a center sleeve (4) as well as a process for producing a cylinder sleeve, wherein multiple sleeves (2, 3) are divided out from a tube (20), thereby characterized, that by one cutting tool (22) an axial movement is described relative to the tube (20) and the tube (20) is moved circumferentially.

The inventive cylinder liner has a contouring on one end. The contouring brings about a supporting of the cylinder liner on a (center) sleeve inside a die casting tool in the manner that at least one highest elevation of the cylinder liner lies against a tool edge of the sleeve. This edge forms for its part in the cylinder sleeve the boundary of the cylinder tube to the crank shaft housing.

Recesses in the contour of the cylinder liner are filled by a metal of the cylinder block (cast in). In the area of the recesses of the contouring a cylinder running surface is formed by the crank case or cylinder block metal.

The filling of the contouring by the cast around material has the consequence that the cylinder liner is supported and therewith an axial movement of the cylinder liner in the direction of the crank case is prevented. Besides this, by the contouring a saving in cylinder liner material is achieved, which as a rule is move expensive than the material of the casting.

The cylinder liners are in general divided out of a long tube. In this case the material savings in cylinder liners can be substantially increased, when the contouring of one cylinder liner forms the negative image of the contouring of a further, corresponding cylinder liner. The material savings can herein be per cylinder liner one half of the maximal contour depth.

For the further optimization of material saving it is further useful, that the contour for each cylinder liner exhibits a periodic symmetry. As a consequence it is then likewise useful, that the corresponding cylinder liner exhibits the same, however phase shifted periodic symmetry.

Since the material saving depends upon the depth of the contouring, it is useful, to utilize the maximal depth available under operating conditions. For this the bottom dead center (direction changing point) of the lower piston ring has been found useful as the border of the contouring. Below this direction changing point the tribologic requirements of the cylinder contact surface is comparative low, so that no disadvantage results, when in this area the cylinder contact surface is partially formed by casting material.

A further component of the invention is a process for production of a cylinder liner. The inventive process, in which cylinder liners are divided out of a single tube, characterizes itself thereby, that a cutting tool describes with regard to the pipe one axial movement, in comparison, to which the pipe itself is circumferentially or rotating moved.

By a suitable control there is thus the material saving cutting out of the inventive cylinder liners made possible. In comparison to a conventional saw cut therewith 3 mm to 4 mm material can be saved.

In a preferred embodiment the cylinder liners are separated from inside towards outside. Thereby it is prevented, without requiring follow-up working, that a burr remains in the inner area of the cylinder liner.

As cutting processes there come into consideration water jet cutting, laser cutting, roll separating, precision cutting or precision stamping. A further advantageous process is the so-called stamp cracking, which is based upon precision cutting, in which however the cutting process is supported by an axial counter force.

BRIEF DESCRIPTION OF THE DRAWING

Advantageous embodiments of the invention are described in greater detail on the basis of the following figures and the process examples.

Therein there are shown.

DETAILED DESCRIPTION OF THE INVENTION

Figure 1:
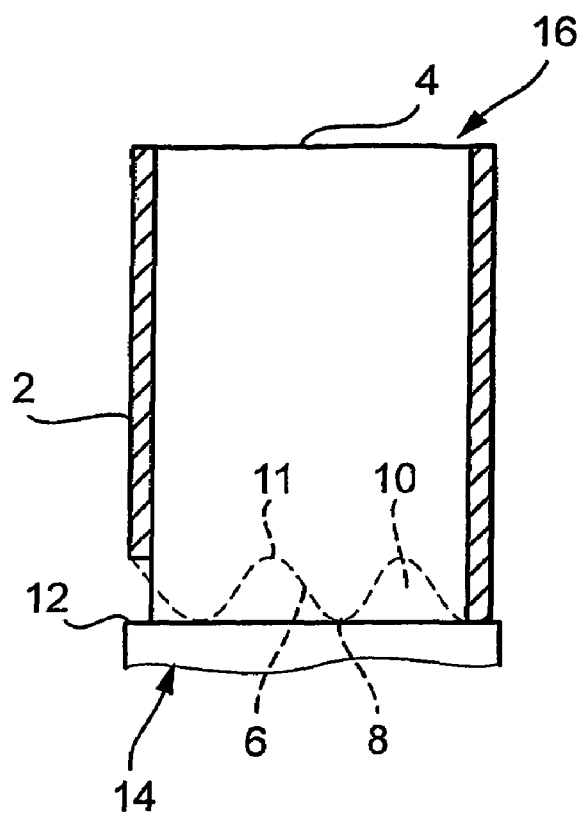
FIG. 1 a cylinder liner with contouring on a center sleeve in a pressure die casting tool, FIG. 2 a cylinder liner with contouring in a cylinder block housing, FIG. 3 a cylinder liner with sinustoulouse contouring, FIG. 4 a cylinder liner with castelated contouring, FIG. 5 a cylinder liner with sinustoulous and two maximum, FIG. 6 a cylinder liner with sinustouslous contouring and one maximum and FIG. 7 a separating process of two cylinder lines from one tube.

In FIG. 1 an inventive cylinder liner 2 is shown, which is seated on a center sleeve 4 of a not shown pressure die casting tool for a cylinder block. The cylinder liner 2 (liner) exhibits on one end facing the crank space 14 a contouring 6. The contouring 6 is here by way of example approximately sinus shaped and exhibits multiple recesses 10 with respectively one minimum 11 and likewise many rises 8 (maximum). The liner is comprised of one super eutetic aluminum-silcon alloy.

By the maxima the liner 2 is supported on one edge 12 of the center sleeve 4. The edge 12 of the center sleeve 4 forms in the cylinder block the crank space 14. The oppositely lying side of the sleeve 2 is bordered by a cylinder head separating surface 16.

A maxima 8 is preferably so oriented relative to the center sleeve 4, that it substantially shields the sleeve 2 from the aluminum flow during the pressure casting. Thereby the casting behind the sleeve, that is a penetration of molten aluminum between liner and center sleeve is reduced.

Figure 2:
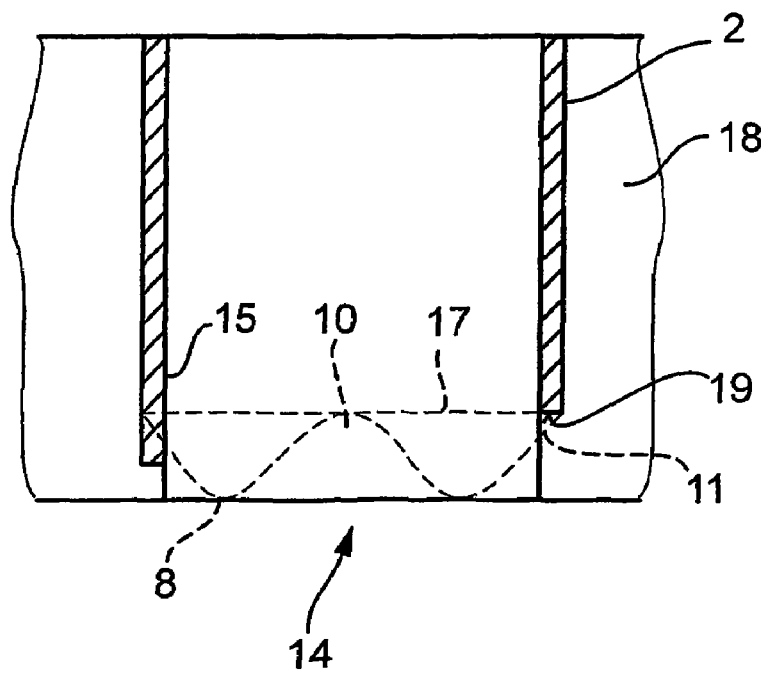

In a cast in state, as shown in FIG. 2, the recesses 10 are filled with the material of the cylinder block (casting). This material is comprised of a conventional casting alloy, for example AlSi9Cu3.

A lower edge 19 of the sleeve 2 lies—with the exception of the maxima 8—on the casting material. A seating of the sleeve in the direction of the crank space 14 is thereby prevented. Further it is thereby prevented, that by a possible existing gap between the sleeve 2 and the casting 18 (not shown) cooling fluid can enter into the oil space.

By the line 17 the bottom dead center or direction changing point of a lower piston ring of a not shown cylinder is marked. In useful manner the minima 11 of the contouring 6 is continued to this line 17. A deeper contouring is fundamentally possible, would however negatively impact the tribulogical characteristics of the cylinder contact surfaces 15 and possibly lead to increased friction wear. The recesses are between 10 mm and 30 mm, preferably between 15 mm and 25 mm.

The cylinder contact surfaces are formed above line 17 by the sleeve 2 and below the line 17 of equal parts of sleeve 2 and casting material 18.

In the FIGS. 3 through 6 examples for the contouring of a cylinder sleeve are illustrated. Basically the contouring can take any desired shaped, taking into consideration an optimal material savings, however a periodic and symmetric contouring is desirable.

Figure 3:
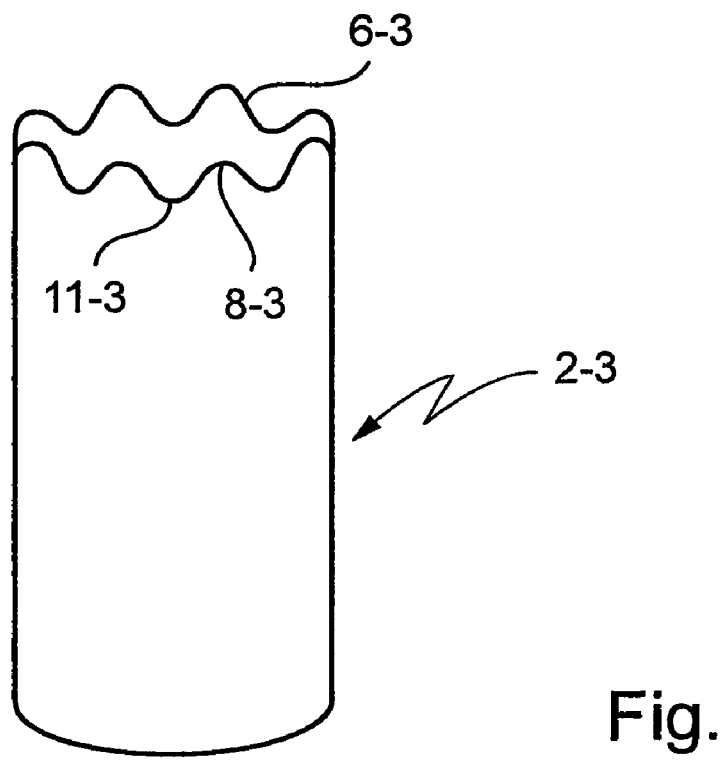
Figure 4:
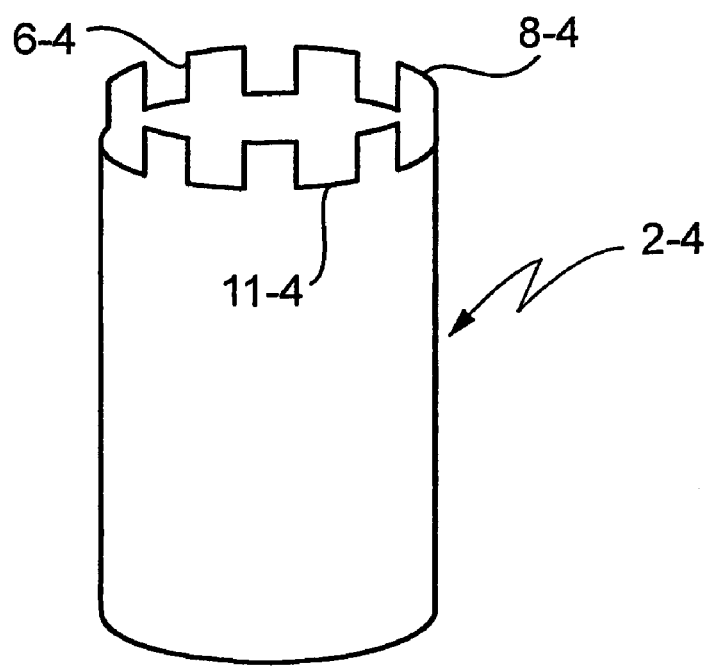

In FIG. 3 a sinus shaped contouring 6-3 of the sleeve 2-3 with eight maxima 8-3 and eight minima 11-3 is shown. In FIG. 4 the contouring 6-4 of the sleeve 2-4 is shown castellated with seven maxima 8-4 and seven minima 11-4. (The second number of the reference number represents the corresponding figure).

Figure 5:
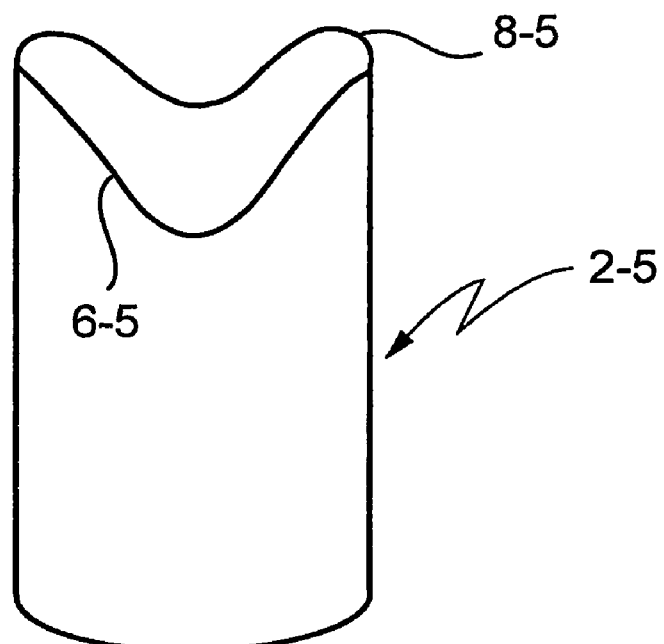
Figure 6:
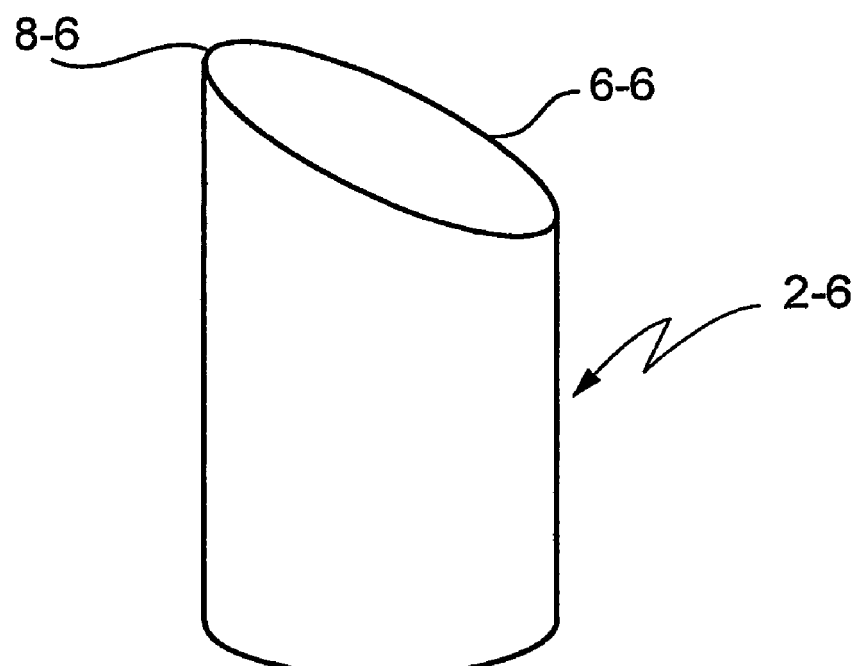

The number of the maxima can also be reduced, for example to two maxima 8-5 in FIG. 5 and two one maxima 8-6 in FIG. 6. As contouring it is likewise conceivable, however not shown here, would be a zigzag pattern, a trapezoid pattern or other curve shapes.

Figure 7:
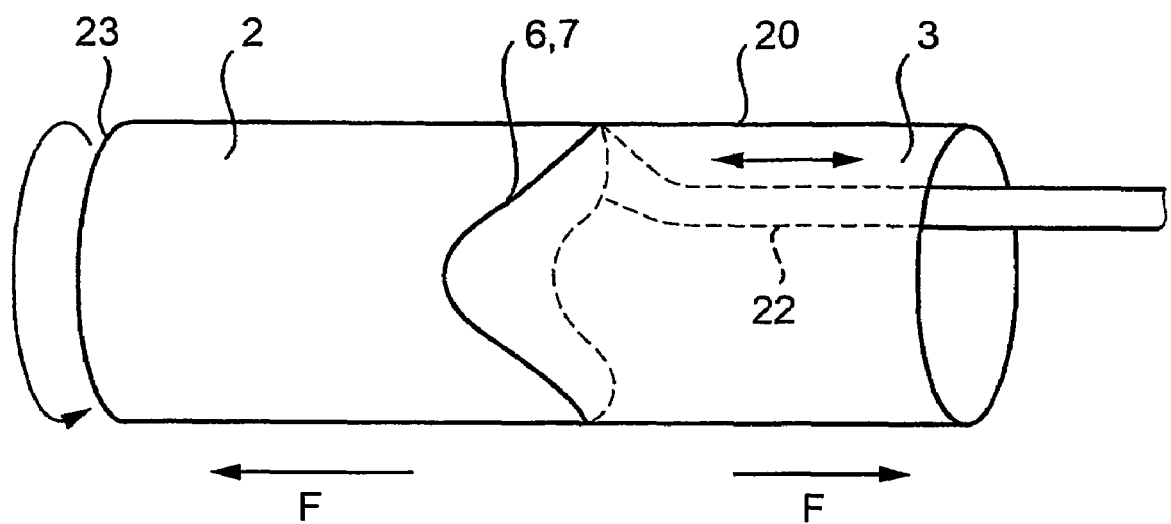

In the following example a process for producing an inventive cylinder liner is described. From a tube 20, which is comprised of a round kneaded or worked super eutetic Al—Si-alloy, a contouring 6 shown in FIG. 7 is cut out by a cutting tool 22. For this the cutting tool 22 is moved axially relative to the tube 20, wherein this movement is superimposed over a rotational movement of the tube. The control of the movements occurs centrally and is coordinated based upon the contour to be produced.

At the same time as the cutting process an application of force F can occur in the axially direction. Beginning with the cut, which is introduced by the cutting tool 22, there occurs by the force F a so-called cracking along the contouring 6. The process is referred to as stamp cracking. One advantage of this process is comprised therein, that no sawdust is lost, whereby again material can be saved.

The cutting 22 is moved according to the above described process along contour 6-5. This is used essentially as an example and corresponds to the contouring 6 shown in FIG. 5. Following the separating process two identical sleeves 2 and 3 remain.

A perpendicular cut 23 following the two sleeves can occur but a conventional saw cut or by a so-called roll separation.

Processes with likewise low sawdust, which is employable analogous to the process according to FIG. 7, include laser cutting, water jet cutting or precision cutting. In preferred manner the cutting occurs with avoidance of formation of a burr from inside towards outside. In the case of using laser welding a burr formation is easier to avoid. Due to the complexity and expense of the apparatus the laser welding could also occur from outside.

If for technical reasons a sawing of the sleeves is desired, then this is possible with a contouring according to FIG. 6.

For the inventive sleeve basically all tribulogical suitable materials can be employed. In most cases a super eutetic Al—Si-alloy, preferably alloys with a Si component of between 15% and 25%, as well as alloys based on iron. In particular in the case of sleeves based on iron the material saving supplementally means also a weight saving.

The invention claimed is:

1. A cylinder sleeve for a cylinder crank case, wherein the cylinder sleeve (2) includes on one end (5) a contouring (6) having multiple recesses (10),
   wherein at least one highest rise (8) of the contouring (6) supports the cylinder sleeve (2) in a pressure injection casting tool against a center sleeve (4).

2. The cylinder sleeve according to claim 1, wherein the contouring (6) of the cylinder sleeve (2) corresponds to the negative shape of a contouring of a corresponding cylinder sleeve (3).

3. The cylinder sleeve according to claim 2, wherein the contouring (6) of the cylinder sleeve (2) exhibits a phase displaced periodic symmetry with the contouring (7) of the corresponding cylinder sleeve (3).

4. The cylinder sleeve according to claim 1, wherein a deepest recess (11) of the cylinder sleeve (2) extends to the lower bottom dead center (11) of a lower most piston ring.

5. A process for producing a cylinder sleeve for a cylinder crank case, comprising:
   dividing out multiple sleeves (2, 3) from a tube (20), wherein the dividing step includes
   cutting a contouring (6) by using a cutting tool (22), wherein the cutting tool (22) moves axially relative to the tube (20) while the tube (20) moves circumferentially,
   wherein the cylinder sleeve (2) includes on one end (5) a contouring (6), wherein at least one highest rise (3) of the contouring (6) supports the cylinder sleeve (2) in a pressure injection casting tool against a center sleeve (4).

6. The process according to claim 5, wherein the cutting tool (22) is moved in the inside of the pipe (20) and the cutting process occurs from inside towards outside.

7. The process according to claim 5, wherein the cutting process is carried out by water jet cutting, by laser cutting, by roll separation or precision cutting or stamping.

8. The process according to claim 5, wherein during the cutting process a force (F) is applied against the pipe in both axial directions.

* * * * *